United States Patent
Arora et al.

(10) Patent No.: US 10,268,510 B1
(45) Date of Patent: Apr. 23, 2019

(54) SELECTIVE PRIORITIZATION OF PROCESSING OF OBJECTS

(71) Applicant: Juniper Networks, Inc., Sunnyvale, CA (US)

(72) Inventors: Amit Arora, Bangalore (IN); Srinivasa DS, Mysore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 227 days.

(21) Appl. No.: 15/263,775

(22) Filed: Sep. 13, 2016

(51) Int. Cl.
- G06F 9/46 (2006.01)
- G06F 9/48 (2006.01)
- H04L 12/751 (2013.01)
- G06F 9/50 (2006.01)

(52) U.S. Cl.
CPC ......... G06F 9/4881 (2013.01); G06F 9/5038 (2013.01); H04L 45/02 (2013.01)

(58) Field of Classification Search
None
See application file for complete search history.

(56) References Cited

U.S. PATENT DOCUMENTS

| | | | | |
|---|---|---|---|---|
| 6,152,612 A * | 11/2000 | Liao | ................... | G06F 17/5022 703/15 |
| 7,155,716 B2 * | 12/2006 | Hooman | ............... | G06F 9/4881 718/102 |
| 7,650,601 B2 * | 1/2010 | Aguilar, Jr. | ........... | G06F 9/4843 718/103 |
| 7,983,299 B1 * | 7/2011 | Ma | .......................... | H04L 47/52 370/229 |
| 8,103,589 B2 * | 1/2012 | Nathan | .................. | G06Q 20/10 235/378 |
| 8,370,842 B2 * | 2/2013 | Bellows | ............... | G06F 9/4881 718/103 |
| 8,825,952 B2 * | 9/2014 | Benhase | ............. | G06F 12/0868 711/103 |
| 8,996,789 B2 * | 3/2015 | Benhase | ............. | G06F 12/0868 711/103 |
| 2011/0161970 A1 * | 6/2011 | Bellows | ............... | G06F 9/4881 718/103 |
| 2012/0303869 A1 * | 11/2012 | Benhase | ............. | G06F 12/0868 711/103 |

* cited by examiner

Primary Examiner — Van H Nguyen
(74) Attorney, Agent, or Firm — Harrity & Harrity, LLP

(57) ABSTRACT

A device may receive one or more first objects and one or more second objects to be processed. The device may store, in a first queue, information identifying the one or more first objects, the one or more second objects, and an order in which the one or more first objects and the one or more second objects were received. The device may store, in a second queue, information identifying the one or more first objects based on the one or more first objects being associated with the first priority level. The device may process the one or more first objects and the one or more second objects based on the first queue and the second queue. The device may perform one or more actions based on processing the one or more first objects and the one or more second objects.

20 Claims, 7 Drawing Sheets

SELECTIVE PRIORITIZATION OF PROCESSING OF OBJECTS

In computer processing, objects, tasks, or instructions may be processed based on positions in a queue. For example, a kernel, processing component, network device, or the like may maintain a queue identifying an order in which to process objects or to perform actions corresponding to the objects.

SUMMARY

According to some possible implementations, a device may include one or more processors. The one or more processors may receive one or more first objects and one or more second objects to be processed. The one or more first objects may have a first priority level. The one or more second objects may have a second priority level that is lower than the first priority level. The one or more processors may store, in a first queue, information identifying the one or more first objects, the one or more second objects, and an order in which the one or more first objects and the one or more second objects were received. The one or more processors may store, in a second queue, information identifying the one or more first objects based on the one or more first objects being associated with the first priority level. The one or more processors may process the one or more first objects and the one or more second objects based on the first queue and the second queue. At least one second object, of the one or more second objects, may be processed before all of the one or more first objects have been processed. The one or more processors may perform one or more actions based on processing the one or more first objects and the one or more second objects.

According to some possible implementations, a non-transitory computer-readable medium may store one or more instructions that, when executed by one or more processors of a device, may cause the one or more processors to receive one or more prioritized objects and one or more non-prioritized objects to be processed. The one or more prioritized objects may have a first priority level. The one or more non-prioritized objects may have a second priority level that is lower than the first priority level. The one or more instructions, when executed by one or more processors of a device, may cause the one or more processors to generate a temporal queue that identifies the one or more prioritized objects, the one or more non-prioritized objects, and an order in which the one or more prioritized objects and the one or more non-prioritized objects were received by the device. The one or more instructions, when executed by one or more processors of a device, may cause the one or more processors to generate a prioritized queue that identifies the one or more prioritized objects based on the one or more prioritized objects being associated with the first priority level. The one or more instructions, when executed by one or more processors of a device, may cause the one or more processors to process the one or more prioritized objects and the one or more non-prioritized objects based on the prioritized queue and the temporal queue. At least one non-prioritized object, of the one or more non-prioritized objects, may be processed before all of the one or more prioritized objects have been processed. The one or more instructions, when executed by one or more processors of a device, may cause the one or more processors to perform one or more actions based on processing the one or more prioritized objects and the one or more non-prioritized objects.

According to some possible implementations, a method may include receiving, by a device, a set of prioritized objects and a set of non-prioritized objects to be processed. The set of prioritized objects may have a first priority level. The set of non-prioritized objects may have a second priority level that is lower than the first priority level. The method may include generating, by the device, a temporal queue that identifies the set of prioritized objects, the set of non-prioritized objects, and an order in which the set of prioritized objects and the set of non-prioritized objects were received by the device. The method may include generating, by the device, a prioritized queue that identifies the set of prioritized objects based on the set of prioritized objects being associated with the first priority level. The method may include processing, by the device, the set of prioritized objects and the set of non-prioritized objects based on the prioritized queue and the temporal queue. At least one non-prioritized object, of the set of non-prioritized objects, may be processed before all of the set of prioritized objects have been processed. The method may include performing, by the device, one or more actions based on processing the set of prioritized objects and the set of non-prioritized objects.

DETAILED DESCRIPTION

Figure 1A:
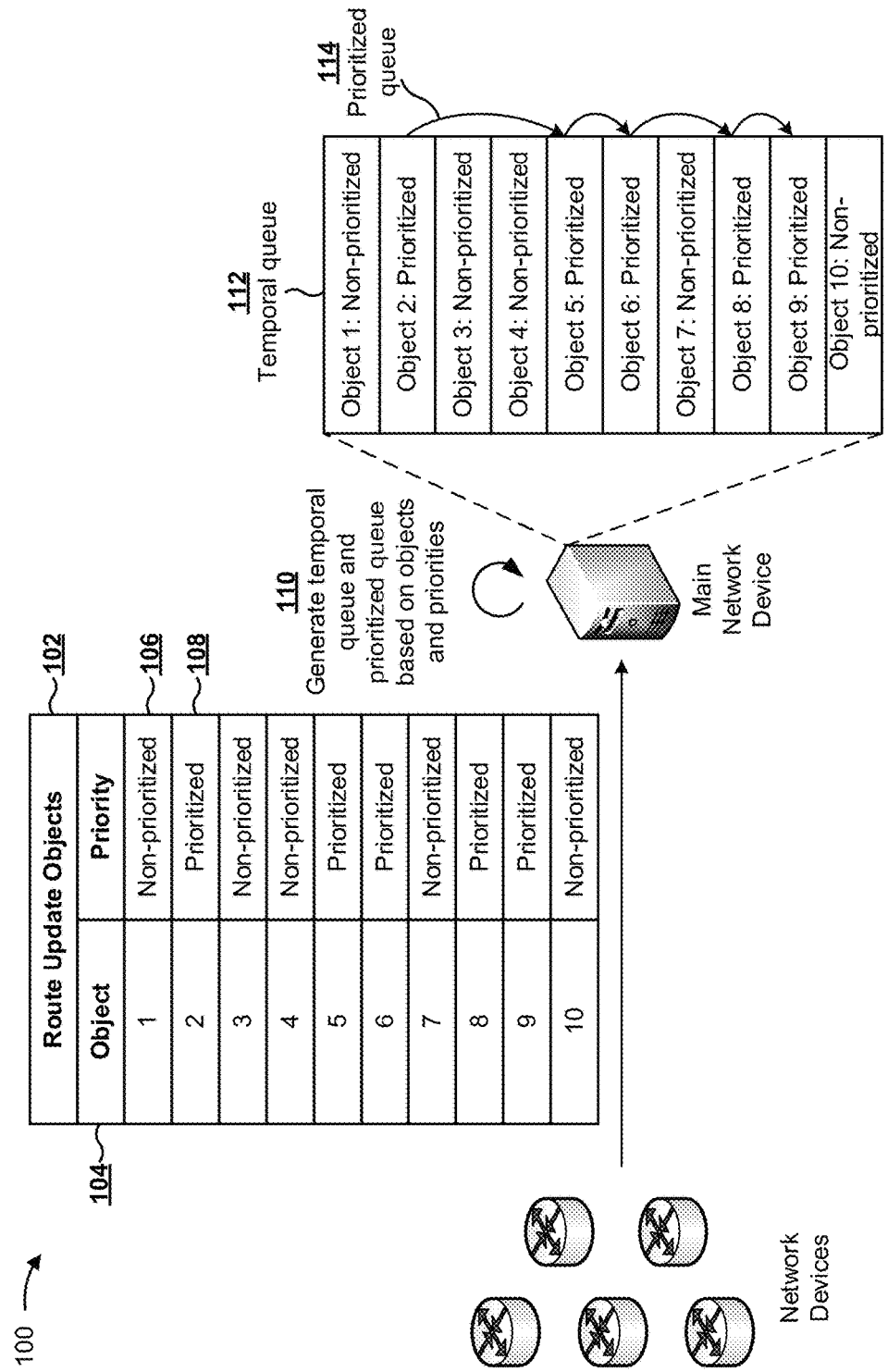
FIGS. 1A-1D are diagrams of an overview of an example implementation described herein.

The following detailed description of example implementations refers to the accompanying drawings. The same reference numbers in different drawings may identify the same or similar elements.

A network device (e.g., a router, switch, hub, or the like) may perform a set of operations based on a queue. The queue may identify objects corresponding to the operations. The queue may store information based on an order in which the objects are received by the network device. As one example, objects may identify route updates corresponding to routes, and the operations may include adding, removing, or modifying forwarding table entries for the routes based on processing the objects. A queue may list an order in which operations are to be completed, and the order may be based on the order in which the objects are received by the network device.

Modification of the queue may be desired in order to prioritize processing of some objects over processing of other objects. For example, when objects correspond to route updates for a routing table or forwarding table, it may be desirable to prioritize route updates for particular routes. Also, controlling the order of route updates may be useful in response to network topology changes. For example, in a network that uses an Open Shortest Path First (OSPF) routing protocol, objects corresponding to internal Border Gate Protocol (iBGP) neighbors may be prioritized before other objects. Also, providing route prioritization options for customers of a network service provider can improve customer relations and business value for the network service provider.

Notwithstanding potential benefits, prioritizing processing can be problematic in some situations. For example, if a non-prioritized object for a particular route is deleted, and a prioritized object for the particular route is added, the prioritized object may be processed before deletion of the non-prioritized object, thereby causing configuration problems. Further, consecutive processing of a large quantity of prioritized objects may cause untenable delay in processing of non-prioritized objects.

Implementations described herein may provide a temporal queue and a prioritized queue, which may be collectively referred to herein as an interleaved queue. As described herein, a temporal queue may identify prioritized objects and non-prioritized objects in an order in which they are received. The prioritized queue may identify the prioritized objects of the temporal queue and/or may identify positions of the prioritized objects in the temporal queue.

In some implementations, a network device may selectively process objects from the prioritized queue or the temporal queue, which permits prioritization of processing of objects while maintaining knowledge of a temporal order associated with the objects. In some cases, the network device may selectively prioritize processing of particular objects (e.g., to prevent a prioritized object from being processed before a non-prioritized object that needs to be processed before the prioritized object). This may reduce errors caused by out-of-order processing of objects and/or improve efficiency of processing the objects.

Using the temporal queue and the prioritized queue, assignment of priorities for object processing is achieved, thus permitting prioritized establishment of routes (e.g., based on a service level agreement, a particular routing protocol, etc.). Further, errors based on out-of-order processing are reduced, for example, for adds and deletes of route update objects. Still further, delays are reduced in processing non-prioritized objects when a prioritized queue is implemented by periodically processing objects from the temporal queue, irrespective of whether the objects are prioritized or non-prioritized objects.

While implementations described herein primarily relate to objects corresponding to route updates, the implementations described herein are not so limited. For example, implementations described herein may be applied to any system using prioritized queuing techniques, such as queuing systems associated with a kernel, a processing module, or the like.

FIGS. 1A-1E are diagrams of an overview of an example implementation 100 described herein. As shown in FIG. 1A, and by reference number 102, individual network devices may provide objects (e.g., route update objects) to a main network device. As shown by reference number 104, in the example of FIG. 1A, the objects include object 1 through object 10. Each route update object may be associated with a different route that is identified by a corresponding route prefix (not shown). As further shown in FIG. 1A, each route object may identify a priority level (e.g., "non-prioritized" or "prioritized," as shown by reference numbers 106 and 108, respectively). As shown by referenced number 110, the main network device may generate a temporal queue and prioritized queue based on the objects and the priority levels. For example, the temporal queue may be generated based on an order in which the objects are received and may identify the prioritized objects and the non-prioritized objects, as shown by reference number 112.

A prioritized queue may identify each prioritized object of the temporal queue. For example, as shown by reference number 114, the prioritized queue may identify a sequence of prioritized objects. Here, the prioritized queue is shown by the curved arrows between the prioritized objects of the temporal queue. The prioritized queue may permit the main network device to identify prioritized objects, of the temporal queue, for prioritized processing.

In some implementations, the temporal queue and the prioritized queue may identify the objects based on pointers to memory associated with the objects, based on variable names, etc. In some implementations, a temporal queue may store the temporal queue of objects (e.g., the temporal queue may be a data structure that stores objects and identifies an order associated with the objects).

Figure 1B:
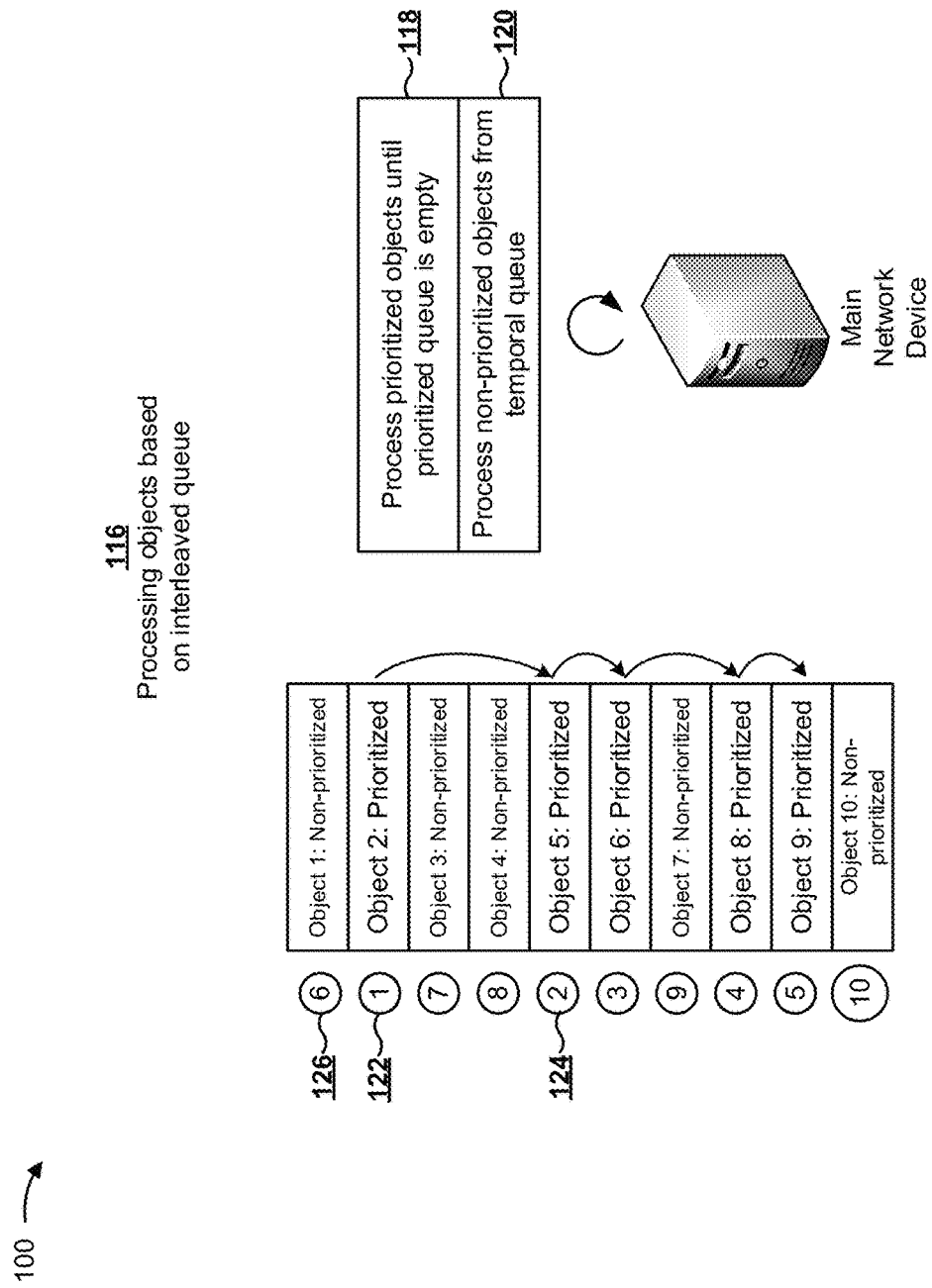
Figure 1C:
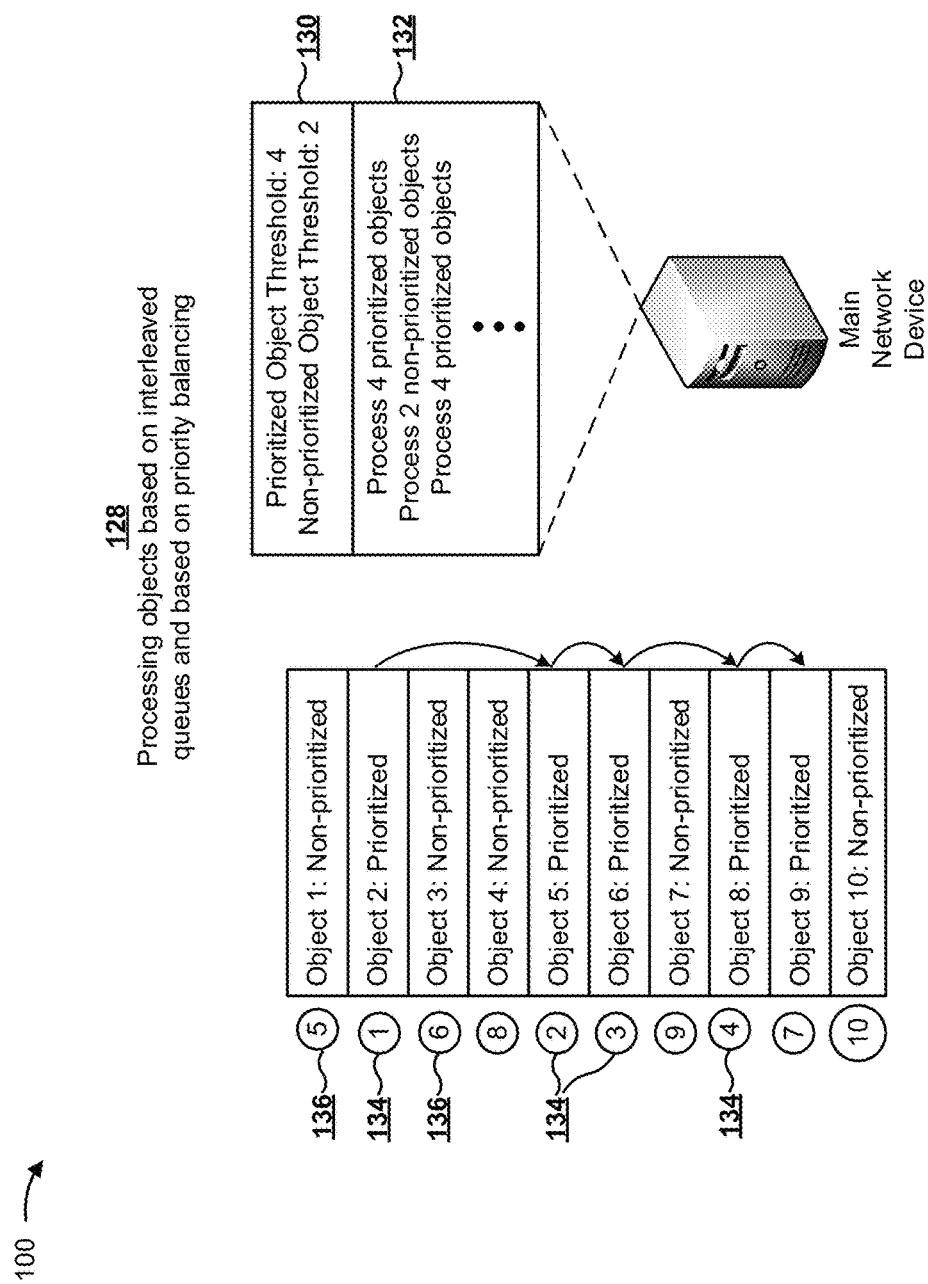

Referring to FIG. 1B, the main network device may process objects based on interleaved queues (as shown by reference number 116). As described herein, an interleaved queue may include a combination of the temporal queue and the prioritized queue. As shown by reference number 118, prioritized objects may be processed until the prioritized queue is empty. Subsequently, as shown by reference number 120, non-prioritized objects are processed from the temporal queue. In FIGS. 1B-1E, an order in which objects 1-10 are processed is shown by the circled numerals adjacent to objects 1-10.

More specifically, as shown by reference number 122, object 2 is processed first since object 2 is the first prioritized object in the temporal queue. As further shown, objects 2, 5, 6, 8, and 9 are prioritized objects, and objects 1, 3, 4, 7, and 10 are normal (non-prioritized) objects. Accordingly, as shown by reference number 124, objects 5, 6, 8, and 9 are processed after object 2 (e.g., based on objects 2, 5, 6, 8, and 9 being identified by the prioritized queue). As shown by reference number 126, objects 1, 3, 4, 7, and 10 are processed subsequently to the prioritized objects (e.g., in the order as identified in the temporal queue).

In some implementations, objects may be processed in another manner than the manner described in FIG. 1B. For example, referring to FIG. 1C, objects may be processed based on interleaved queues and based on priority balancing (as shown by reference number 128). In some implementations, priority balancing may be implemented to reduce delay in processing non-prioritized objects. As shown by reference number 130, a prioritized object threshold and a non-prioritized object threshold may be set. As shown by reference number 132, the prioritized object threshold and the non-prioritized object threshold may define the order in which objects are to be processed. For example, based on a prioritized object threshold with a value of four and a non-prioritized object threshold with a value of two, the network device may process four prioritized objects from the prioritized queue, followed by two objects (whether the two objects are prioritized or non-prioritized) from the temporal queue, followed by four prioritized objects from the prioritized queue, and so on.

Accordingly, the main network device may process the objects in the interleaved queue by processing four prioritized objects starting at the top of the prioritized queue, followed by processing two objects starting at the top of the temporal queue (whether the objects are prioritized or non-prioritized). As shown by reference number 134, the main network device first processes the four prioritized objects (e.g., objects 2, 5, 6, and 8) until the prioritized object threshold is satisfied. As shown by reference number 136, based on satisfying the prioritized object threshold, the main network device processes two objects starting from the top of the temporal queue (e.g., object 1 and object 3) until the non-prioritized object threshold is satisfied. After the non-prioritized object threshold is satisfied, the main network device may return to processing objects based on the prioritized object threshold (e.g., object 9), then based on the non-prioritized object threshold (e.g., objects 4, 7, and 10), and so on. In this way, priority balancing may be implemented to reduce delay in processing non-prioritized operations.

Figure 1D:
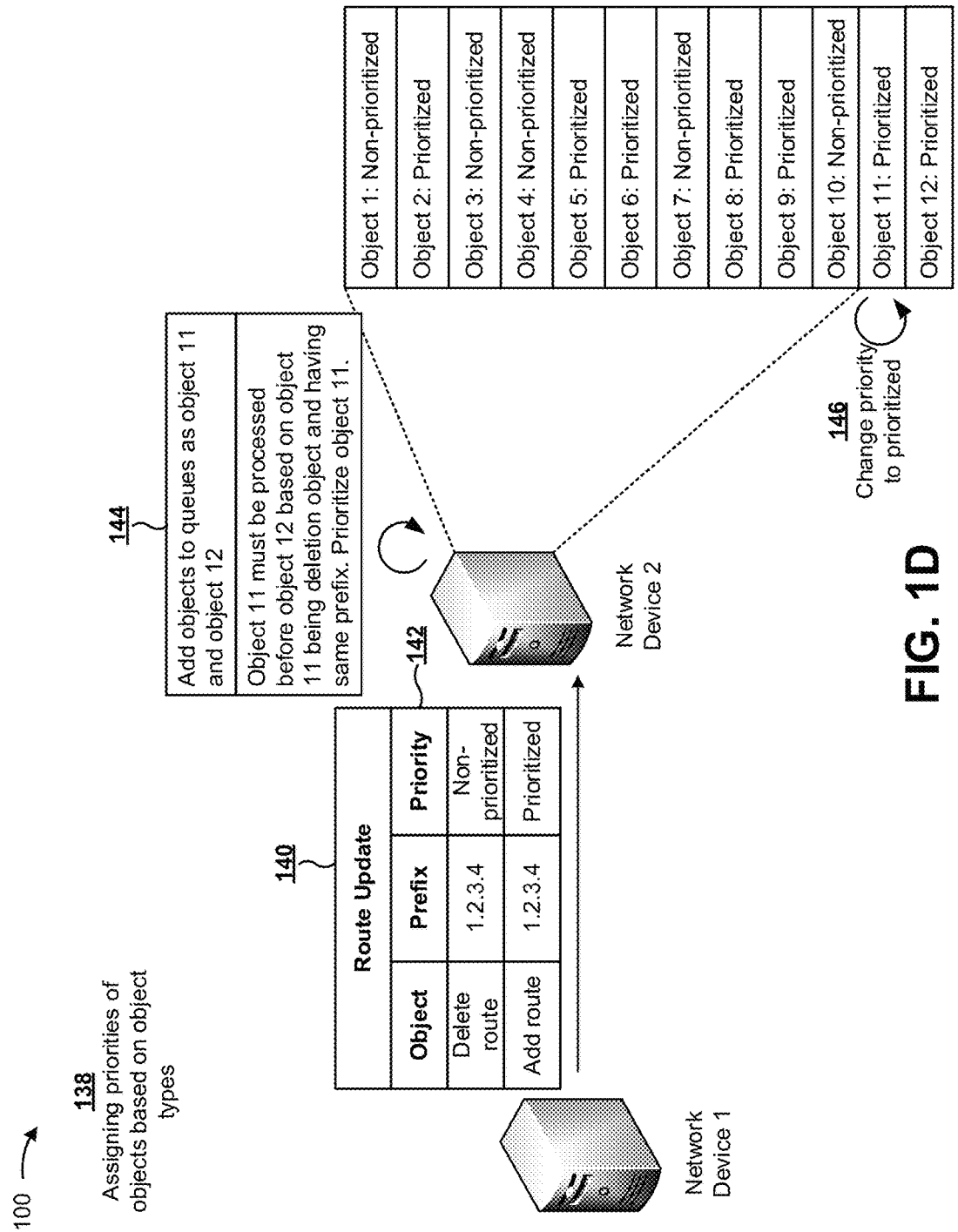

FIG. 1D shows an example of performing a set of operations to prevent a prioritized object from being processed before a non-prioritized object, in a situation where the non-prioritized object should be processed first. For example, the non-prioritized object may be associated a particular object type that indicates that the non-prioritized object is to be processed before the prioritized object. In such a case, a priority level associated with the non-prioritized object may be updated based on the object type of the non-prioritized object, as shown by reference number 138.

As shown in FIG. 1D, and by reference number 140, network device 2 may receive a route update that identifies two objects. As further shown, a first object of the two objects is an object to delete a route (e.g., an entry in a routing table) associated with a prefix of 1.2.3.4, and a second object of the two objects is an object to add a route associated with the prefix of 1.2.3.4. Network device 2 may need to process the first object before processing the second object, so that the value of the route identified by the second object can be added to the entry in the routing table that was deleted based on the first object. As shown by reference number 142, the first object may be associated with a non-prioritized priority level, and the second object may be associated with a prioritized priority level. Therefore, the second object may be processed before the first object, which may cause configuration problems for the routing table and/or may cause network configuration issues.

As shown by reference number 144, network device 2 may add the first object and the second object to the temporal queue as object 11 and object 12, respectively. As further shown, network device 2 may determine that object 11 (e.g., the deletion object) is to be processed before object 12 (e.g., the add object) based on object 11 and object 12 being associated with the same prefix (e.g., 1.2.3.4), and based on object 11 being associated with an object type of a deletion object. As further shown, network device 2 may prioritize object 11 (e.g., may change a priority level of object 11 to prioritized, and may add object 11 to the prioritized queue). Thus, when the interleaved queue is processed, object 11 is likely to be processed before object 12, thus reducing errors in network configuration and improving efficiency of processing objects.

As discussed above with respect to FIGS. 1A-1D, assignment of priorities for object processing is achieved, thus permitting prioritized establishment of routes (e.g., based on a service level agreement, a particular routing protocol, etc.). Further, errors based on out-of-order processing are reduced, for example, for adds and deletes of route update objects. Still further, delays are reduced in processing non-prioritized objects when a prioritized queue is implemented.

As indicated above, FIGS. 1A-1D are provided merely as an example. Other examples are possible and may differ from what was described with regard to FIGS. 1A-1D.

Figure 2:
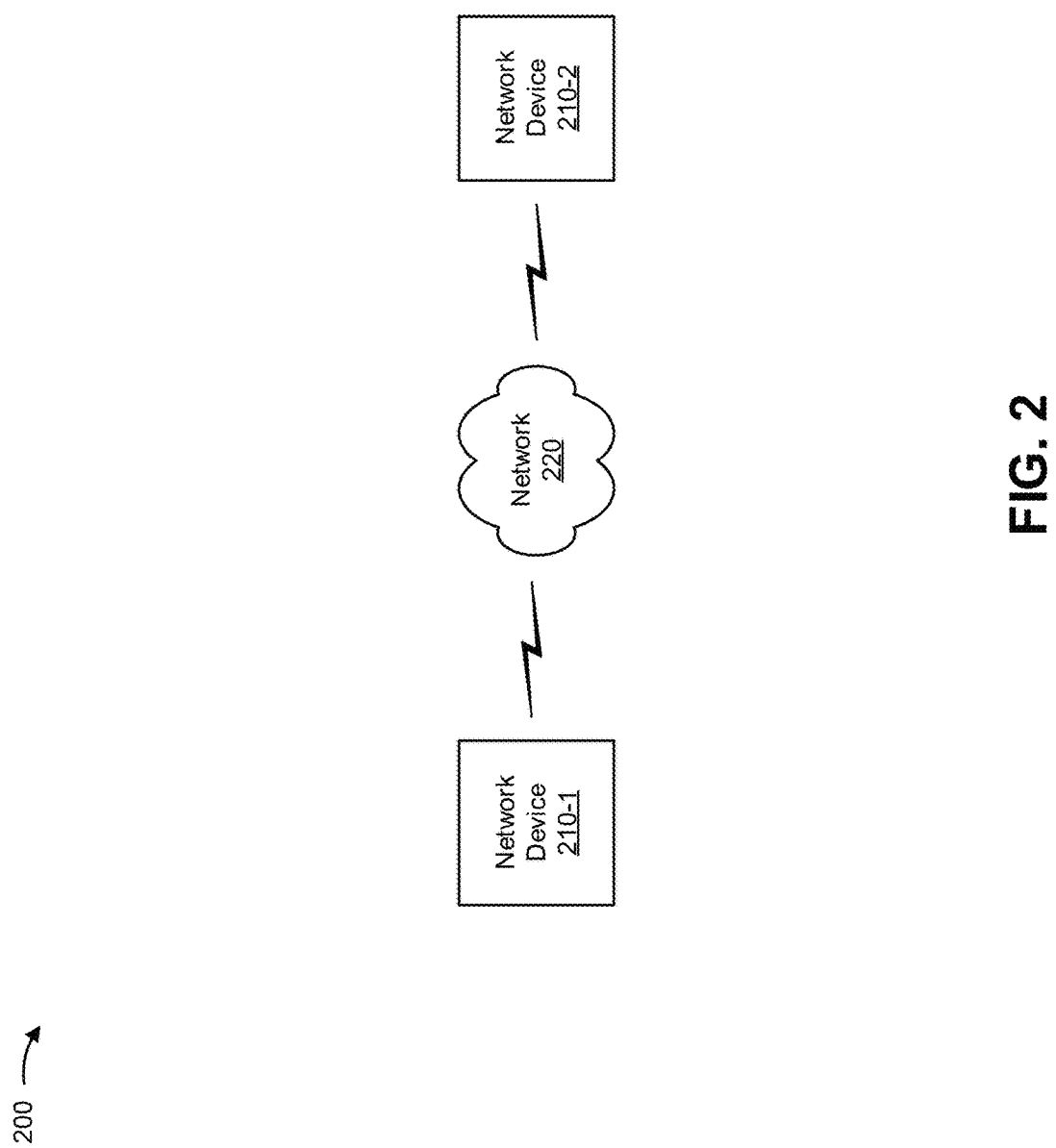
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-N (N≥1) (hereinafter referred to collectively as "network devices 210," and individually as "network device 210") and network 220. Devices of environment 200 may interconnect via wired connections, wireless connections, or a combination of wired and wireless connections.

Network device 210 includes one or more devices (e.g., one or more traffic transfer devices) capable of processing and/or transferring traffic between endpoint devices. For example, network device 210 may include a firewall, a router, a gateway, a switch, a hub, a bridge, a reverse proxy, a server (e.g., a proxy server), a security device, an intrusion detection device, a load balancer, or a similar device. In some implementations, network device 210 may be associated with a kernel, an object processor, or the like, capable of processing objects based on a temporal queue and a prioritized queue.

Network 220 includes one or more wired and/or wireless networks. For example, network 220 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
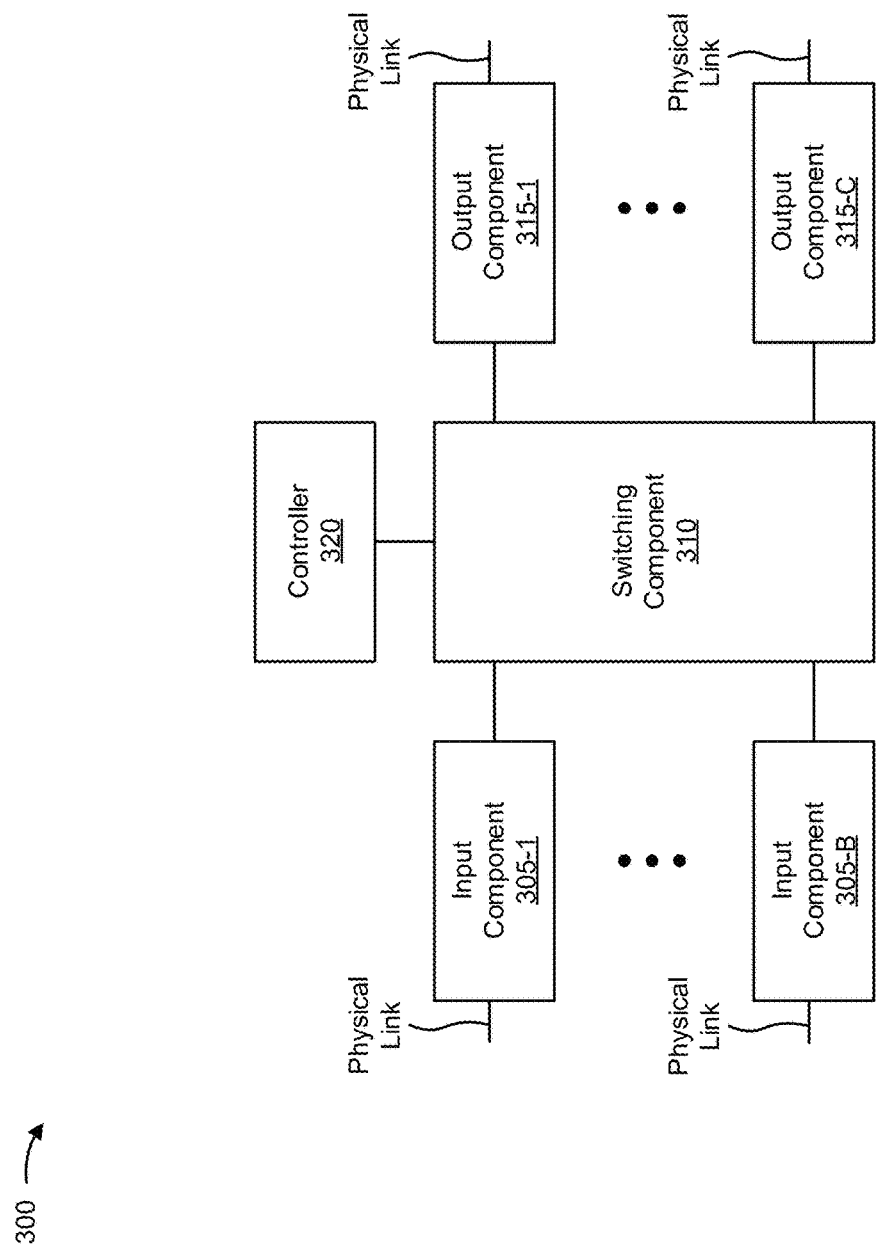
FIG. 3 is a diagram of example components of one or more devices of FIG. 2.

FIG. 3 is a diagram of example components of a device 300. Device 300 may correspond to network device 210. In some implementations, network device 210 may include one or more devices 300 and/or one or more components of device 300. As shown in FIG. 3, device 300 may include a set of input components 305, a switching component 310, a set of output components 315, and a controller 320. In some implementations, components of devices 300 may interconnect via wired connections, wireless connections, or a combination of wired and wireless connections.

Input component 305 includes a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 interconnects input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 includes a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor in the form of, for example, a central processing unit (CPU), a microprocessor, a microcontroller, a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
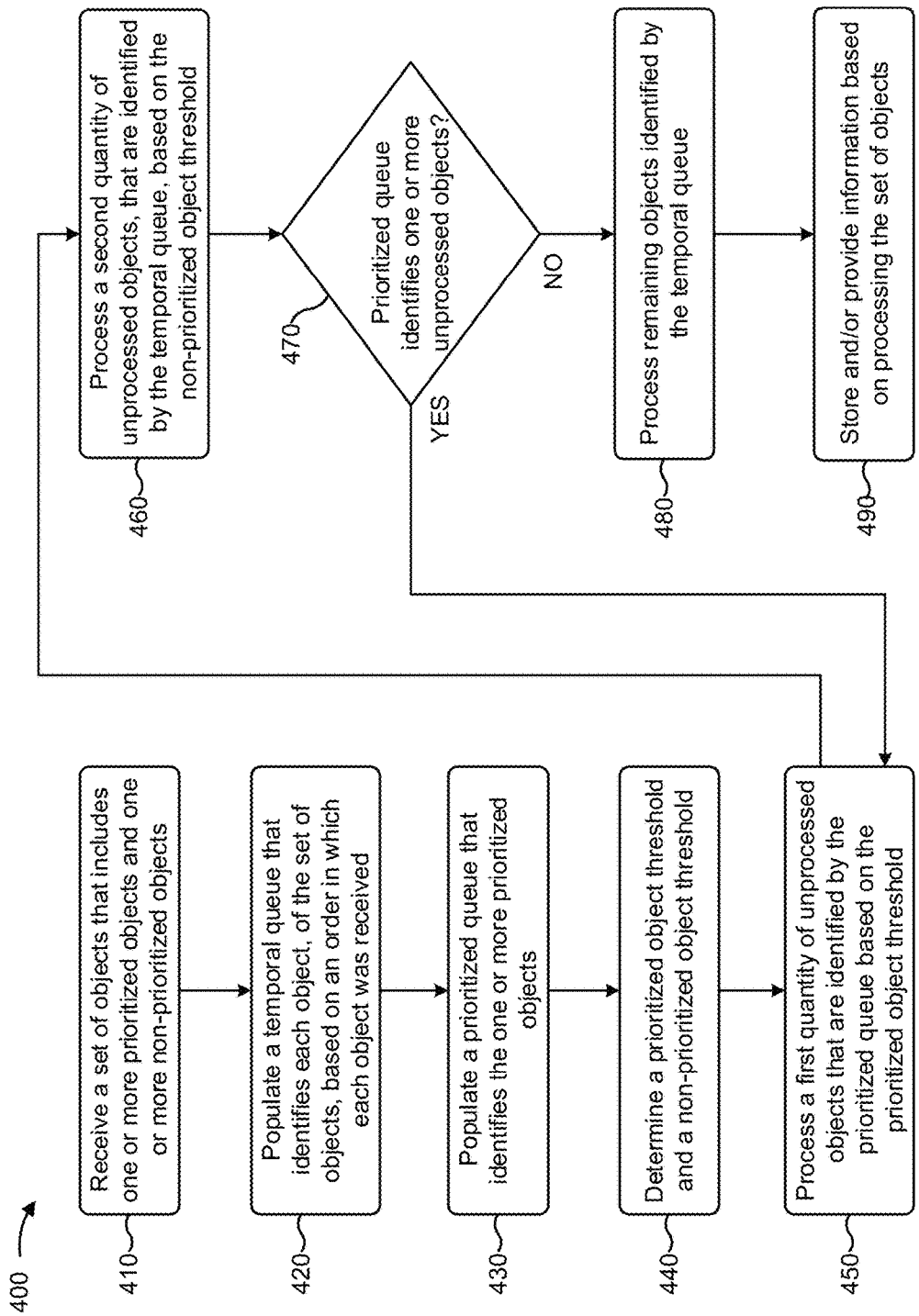
FIG. 4 is a flow chart of an example process for processing objects based on a prioritized queue and a temporal queue.

FIG. 4 is a flow chart of an example process 400 for processing objects based on a prioritized queue and a temporal queue. In some implementations, one or more process blocks of FIG. 4 may be performed by network device 210. For example, one or more process blocks of FIG. 4 may be performed by a kernel associated with network device 210, a processing module associated with network device 210, or the like.

As shown in FIG. 4, process 400 may include receiving a set of objects that includes one or more prioritized objects and one or more non-prioritized objects (block 410). For example, network device 210 may receive information identifying a set of objects. In some implementations, the set of objects may include one or more prioritized objects and one or more non-prioritized objects. As one example, objects may include route updates for a route. In such a case, objects may be associated with respective route prefixes (e.g., network addresses that identify particular routes) and network device 210 may populate a forwarding table based on performing actions associated with the objects. In some implementations, objects may be identified as prioritized or non-prioritized based on information associated with the objects (e.g., a flag, a particular bit value, information identifying a priority level, a respective network address associated with each object, a respective network device from which each object is received, information received in association with each object, etc.).

In some implementations, objects may be identified as prioritized objects or non-prioritized objects based on types of the objects, based on devices from which the objects are received, or the like. For example, network device 210 may determine that objects that are associated with a particular type of route update are to be prioritized (e.g., objects corresponding to neighboring network devices 210, objects associated with internal Border Gate Protocol (iBGP) neighbors, objects associated with a network service incident, etc.). As another example, network device 210 may determine that objects corresponding to a route that is associated with a service level agreement are to be prioritized. As yet another example, network device 210 may determine that objects received from a particular device (e.g., a device that is more important to network operation than other devices, a network that is associated with a service level agreement, etc.) are to be prioritized. In this way, network device 210 prioritizes processing of objects based on sources, types, and/or other information associated with the objects, which improves network functionality and permits implementation of service level agreements for updating of routes.

In some implementations, network device 210 may receive a batch of multiple objects. For example, network device 210 may receive a message that identifies multiple objects that are to be processed. In this case, network device 210 may add the multiple objects to the temporal queue and/or the prioritized queue based on priority levels associated with the multiple objects. Queueing batches of objects for processing may conserve network and/or computational resources that would otherwise be used to process objects that are received in multiple different messages.

In some implementations, network device 210 may receive information identifying a single object. For example, network device 210 may receive objects from different network devices, and may add the objects to one or more queues as the objects are received. In this way, it is possible to queue objects received from different network devices over time.

As further shown in FIG. 4, process 400 may include populating a temporal queue that identifies each object, of the set of objects, based on an order in which each object was received (block 420). For example, network device 210 may populate or generate a temporal queue based on the set of objects. In some implementations, the temporal queue may identify each object, of the set of objects, and an order in which each object was received. For example, network device 210 may receive a first object, and may add the first object to the queue in a first spot. Network device 210 may then receive a second object, and may add the second object to the queue in a second spot subsequent to the first spot. In other words, the temporal queue may identify both prioritized objects and non-prioritized objects, and may identify the order in which the prioritized objects and the non-prioritized objects are received. The temporal queue may permit processing of and tracking of objects in an order in which the objects were received.

As further shown in FIG. 4, process 400 may include populating a prioritized queue that identifies the one or more prioritized objects (block 430). For example, network device 210 may populate a prioritized queue that identifies the one or more prioritized objects of the set of objects. In some implementations, the prioritized queue may identify each prioritized object of the one or more prioritized objects. For example, the prioritized queue may include a data structure that identifies each prioritized object (e.g., based on respective pointers, respective locations in the temporal queue, etc.). In some implementations, the prioritized queue may identify an order in which the prioritized objects are received (e.g., a temporal order, which may permit prioritized objects that are received earliest to be processed first).

In some implementations, prioritized objects may have one of multiple, different priority levels. For example, objects may be identified as low priority, intermediate priority, high priority, etc. Additionally, or alternatively, objects may be assigned with a numerical value indicating priority (e.g., a value of 7 on a scale from 0-10). In such a case, network device 210 may populate multiple, different prioritized queues based on priority levels of the prioritized objects (e.g., highest prioritized objects are in a first prioritized queue, lower prioritized objects are in a second prioritized queue, etc.). In this way, granularity of prioritization is increased, thereby permitting selective processing of high prioritized objects before intermediate prioritized objects. By generating the prioritized queues as described herein, network device 210 facilitates prioritized processing of prioritized objects, thereby improving efficiency of route updates.

In some implementations, network device 210 may modify a priority level associated with an object. For example, network device 210 may increase a priority level associated with a first object when the first object is to be processed before a second object. As a more particular example, assume that the first object is a non-prioritized object that was received before the second object, and assume that the second object is a prioritized object. Given these assumptions, the first object would be identified before the second object in the temporal queue, and the second object would be identified by the prioritized queue. Thus, network device 210 may be likely to process the second object before the first object. Also assume that the first object and the second object are associated with a particular network address, forwarding table entry, route, route prefix, etc. For example, the first object may identify a first action to perform with regard to the network address, etc., and the second object may identify a second action to perform with regard to the network address, etc. As a more particular example, the first object may indicate to delete a forwarding table entry associated with the network address, and the second object may indicate to add a forwarding table entry associated with the network address. Thus, processing of the second object before the first object may be problematic (e.g., based on the forwarding table entry not being deleted based on the first object before the second object is processed).

In such a case, network device 210 may add the first object to the prioritized queue based on the second object being identified by the prioritized queue and based on the first object and the second object being associated with the same network address, table entry, route, or the like. In this way, when the first object and second object are processed, processing of the first object is prioritized over processing of the second object, thus preserving the order in which the first object and the second object are to be processed. Thus, errors in configuration of a network that includes network device 210 are reduced.

In some implementations, network device 210 may determine that the first object is to be added to the prioritized queue based on an object type of the first object (e.g., based on the first object identifying a delete or remove operation, or the like). Additionally, or alternatively, network device 210 may determine that the first object is to be added to the prioritized queue based on a device from which the first object is received (e.g., a particular network device 210, etc.). By automatically identifying objects to be added to the prioritized queue, network device 210 improves likelihood that objects are processed in a correct order, thereby reducing a quantity of errors and out-of-order processing.

As further shown in FIG. 4, process 400 may include determining a prioritized object threshold and a non-prioritized object threshold (block 440). For example, network device 210 may determine a prioritized object threshold and a non-prioritized object threshold. As described herein, the prioritized object threshold may identify a quantity of prioritized objects to process from the prioritized queue before switching to processing objects from the temporal queue. The non-prioritized object threshold may identify a quantity of objects to process from the temporal queue, before switching back to processing prioritized objects from the prioritized queue. In some implementations, the prioritized object threshold and the non-prioritized object threshold may reduce delay in processing non-prioritized objects. For example, when network device 210 receives a large set of prioritized objects (e.g., 1,000 objects, 10,000 objects, 100,000 objects, etc.), the large set may delay processing of non-prioritized objects, which may cause processing of route updates to be delayed, thereby impacting network performance. By switching between processing objects based on the temporal queue and the prioritized queue, network device 210 thus reduces delay of processing of non-prioritized objects, and thereby improving network performance.

As further shown in FIG. 4, process 400 may include processing a first quantity of unprocessed objects that are identified by the prioritized queue based on the prioritized object threshold (block 450). For example, network device 210 may process a first quantity of unprocessed objects based on the prioritized object threshold. As described herein, an unprocessed object may include an object that has not been processed by network device 210. For example, an unprocessed object may correspond to a route update for a route that has not yet been added to a forwarding table of network device 210. In some implementations, the first quantity may be determined based on the prioritized object threshold (e.g., may be equal to the prioritized object threshold). In this way, network device 210 may prioritize processing of prioritized objects, thus improving network performance and efficiency of processing objects.

As further shown in FIG. 4, process 400 may include processing a second quantity of unprocessed objects, that are identified by the temporal queue, based on the non-prioritized object threshold (block 460). For example, network device 210 may process a second quantity of unprocessed objects. In some implementations, the second quantity may be determined based on the non-prioritized object threshold (e.g., may be equal to the non-prioritized object threshold). The second quantity of unprocessed objects may be selected from the temporal queue. For example, network device 210 may start at an earliest object in the temporal queue, and may process objects identified by the temporal queue until network device 210 has processed the second quantity of unprocessed objects.

Objects processed based on the temporal queue can be prioritized objects or non-prioritized objects. For example, if a first object of the temporal queue is a non-prioritized object and a second object of the temporal queue is a prioritized object, network device 210 may process the non-prioritized object before processing the prioritized object. Thus, the temporal queue permits determination of a temporal order associated with the prioritized objects and the non-prioritized objects, which enables network device 210 to prevent negative consequences associated with out-of-order processing of objects, such as failure to meet service level agreements, improper configuration of route updates, or the like.

In some implementations, network device 210 may process objects of the prioritized queue and the temporal queue in a particular order based on assigning a priority level to one or more objects. For example, network device 210 may process objects from the prioritized queue until a particular object that was assigned a prioritized priority level by network device 210 (e.g., object 11 of FIG. 1D) is reached in the prioritized queue. Based on identifying the particular object, network device 210 may process objects from the temporal queue until the particular object is reached in the temporal queue, and may process the particular object in the temporal queue. After processing the particular object, network device 210 may return to processing objects from the prioritized queue. Thus, processing of temporally subsequent prioritized objects before the particular object may be prevented (e.g., by switching to processing the objects in temporal order until the particular object is processed). In some implementations, network device 210 may store or provide information relating to the processed prioritized and temporal queues.

As further shown in FIG. 4, process 400 may include determining whether the prioritized queue identifies one or more unprocessed objects (block 470). For example, network device 210 may determine whether the prioritized queue identifies one or more unprocessed objects. When the prioritized queue identifies one or more unprocessed objects (e.g., one or more unprocessed prioritized objects) (block 470-YES), network device 210 may return to block 450. That is, network device 210 may process a subset of the unprocessed objects of the prioritized queue until the prioritized object threshold is satisfied. After satisfying the prioritized object threshold, network device 210 may process objects from the temporal queue until the non-prioritized object threshold is satisfied (e.g., according to block 460). Network device 210 may then again determine whether the prioritized queue identifies one or more unprocessed objects (block 470) and may selectively perform the steps described above, or may proceed to block 480, based on whether the prioritized queue identifies one or more unprocessed objects. In this way, network device 210 may iteratively process objects from the prioritized queue and from the temporal queue, which may reduce delay in processing non-prioritized objects, and may permit prioritization of processing of the objects identified by the prioritized queue.

If the prioritized queue does not identify one or more unprocessed objects (block 470-NO), then process 400 may include processing remaining objects identified by the temporal queue (block 480). For example, when network device 210 determines that each object of the prioritized queue has been processed, network device 210 may process a remainder of the objects (e.g., unprocessed objects) of the temporal queue. Thus, network device 210 may process subsets of the set of objects based on the prioritized queue and the temporal queue, thereby improving efficiency of processing the prioritized objects and reducing delay associated with processing the non-prioritized objects.

In some implementations, network device 210 may periodically check the prioritized queue to determine if an object has been added to the prioritized queue. Additionally, or alternatively, network device 240 may receive a notification based on an object being added by the prioritized queue. When network device 210 determines that an object has been added to the prioritized queue, network device 210 may return to block 450 (e.g., network device 210 may process a first quantity of unprocessed objects based on the prioritized object threshold for the newly added object). Accordingly, network device 210 may be able to add objects to the prioritized queue after the prioritized queue has previously been processed by network device 210, thereby improving efficiency of the prioritized queue.

As further shown in FIG. 4, process 400 may include storing and/or providing information based on processing the set of objects (block 490). For example, network device 210 may determine information based on processing the set of objects, and may store or provide the determined information. In some implementations, when the objects are associated with route updates for a forwarding table, network device 210 may store or provide routing information based on processing the route updates. For example, network device 210 may add information identifying routes and prefixes associated with the routes to the forwarding table. Additionally, or alternatively, network device 210 may provide the objects to other network devices 210 so the other network devices 210 can perform similar operations. Additionally, or alternatively, network device 210 may generate an object associated with a route update to identify a route associated with network device 210. In this way, efficiency of processing prioritized objects may be improved. Further, temporal order of objects may be preserved, and prioritization of processing objects may be enabled.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, a network device enables prioritization of object processing for route updates, and permits selective re-prioritization of objects to preserve an order in which the objects are to be processed. Thus, the network device improves network performance and reduces errors associated with out-of-order processing of prioritized and/or non-prioritized objects.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive one or more first objects and one or more second objects to be processed,
the one or more first objects having a first priority level, and
the one or more second objects having a second priority level that is lower than the first priority level;
store, in a first queue, information identifying the one or more first objects, the one or more second objects, and an order in which the one or more first objects and the one or more second objects were received;
store, in a second queue, information identifying the one or more first objects based on the one or more first objects being associated with the first priority level;
process a first quantity of unprocessed objects, of the one or more first objects, based on the first quantity of the unprocessed objects being identified by the second queue,
the unprocessed objects being objects, of the one or more first objects and the one or more second objects, that have not been processed by the device;
process a second quantity of the unprocessed objects, of the one or more first objects and the one or more second objects, based on the first queue;
selectively process a third quantity of the unprocessed objects, of the one or more first objects, or each unprocessed object of the one or more second objects, based on whether every first object has been processed; and
perform one or more actions based on at least one of:
processing the first quantity of the unprocessed objects,
processing the second quantity of the unprocessed objects, or
selectively processing the third quantity of the unprocessed objects.

2. The device of claim 1, where the one or more processors, when processing the third quantity of the unprocessed objects, are further to:
process a fourth quantity of the unprocessed objects of the one or more second objects after processing the third quantity of the unprocessed objects,
where the first quantity is equal in number to the third quantity, and
where the second quantity is equal in number to the fourth quantity.

3. The device of claim 1, where the second quantity of the unprocessed objects includes at least one first object of the one or more first objects.

4. The device of claim 1, where the one or more processors are further to:
determine that a particular second object, of the one or more second objects, is to be processed before a particular first object, of the one or more first objects,
the particular second object being higher than the particular first object in the first queue; and
move the particular second object to the second queue; and
where the one or more processors, when processing the one or more first objects and the one or more second objects, are to:
process the particular second object before processing the particular first object based on the particular second object being moved to the second queue.

5. The device of claim 4, where the one or more processors, when determining that the particular second object is to be processed before the particular first object, are to:

determine that the particular second object is to be processed before the particular first object based on the particular second object being received before the particular first object, and based on the particular second object and the particular first object being associated with a same route, network address, or route prefix.

6. The device of claim 1, where the one or more processors, when performing the one or more actions, are to:
update a forwarding table of the device based on the one or more first objects and the one or more second objects.

7. A non-transitory computer-readable medium storing instructions, the instructions comprising:
one or more instructions that, when executed by one or more processors of a device, cause the one or more processors to:
receive one or more prioritized objects and one or more non-prioritized objects to be processed,
the one or more prioritized objects having a first priority level, and
the one or more non-prioritized objects having a second priority level that is lower than the first priority level;
generate a temporal queue that identifies the one or more prioritized objects, the one or more non-prioritized objects, and an order in which the one or more prioritized objects and the one or more non-prioritized objects were received by the device;
generate a prioritized queue that identifies the one or more prioritized objects based on the one or more prioritized objects being associated with the first priority level;
process a first quantity of unprocessed objects, of the one or more prioritized objects, based on the first quantity of the unprocessed objects being identified by the temporal queue,
the unprocessed objects being objects, of the one or more prioritized objects and the one or more non-prioritized objects, that have not been processed by the device;
process a second quantity of the unprocessed objects, of the one or more prioritized objects and the one or more non-prioritized objects, based on the prioritized queue;
selectively process a third quantity of the unprocessed objects, of the one or more prioritized objects, or each unprocessed object of the one or more non-prioritized objects, based on whether every prioritized object has been processed; and
perform one or more actions based on at least one of:
processing the first quantity of the unprocessed objects,
processing the second quantity of the unprocessed objects, or
selectively processing the third quantity of the unprocessed objects.

8. The non-transitory computer-readable medium of claim 7, where the one or more instructions, when executed by the one or more processors, further cause the one or more processors to:
determine that a particular non-prioritized object, of the one or more non-prioritized objects, is to be processed before a particular prioritized object of the one or more prioritized objects,
the particular non-prioritized object being received before the particular prioritized object; and
add the particular non-prioritized object to the prioritized queue,
the particular non-prioritized object being higher in the prioritized queue than the particular prioritized object.

9. The non-transitory computer-readable medium of claim 8, where the one or more instructions, when executed by the one or more processors, further cause the one or more processors to:
process the one or more prioritized objects from the prioritized queue until the particular non-prioritized object is reached in the prioritized queue;
process remaining objects, of the one or more prioritized objects and the one or more non-prioritized objects, from the temporal queue, until the particular non-prioritized object is reached in the temporal queue;
process the particular non-prioritized object based on reaching the particular non-prioritized object in the temporal queue; and
process the particular prioritized object after the particular non-prioritized object is processed.

10. The non-transitory computer-readable medium of claim 8, where the one or more instructions, that cause the one or more processors to determine that the particular non-prioritized object is to be processed before the particular prioritized object, cause the one or more processors to:
determine that the particular non-prioritized object is to be processed before the particular prioritized object based on the particular non-prioritized object and the particular prioritized object being associated with a particular network address or route prefix,
the particular non-prioritized object indicating to delete a forwarding table entry associated with the particular network address or route prefix, and
the particular prioritized object indicating to add the forwarding table entry associated with the particular network address or route prefix.

11. The non-transitory computer-readable medium of claim 7, where the one or more prioritized objects include a plurality of prioritized objects and the one or more non-prioritized objects include a plurality of non-prioritized objects; and
where the one or more instructions, that cause the one or more processors to process the one or more prioritized objects and the one or more non-prioritized objects, cause the one or more processors to:
process a first subset of the plurality of prioritized objects;
process a second subset of the plurality of non-prioritized objects after processing the first subset of the plurality of prioritized objects and based on the temporal queue; and
selectively process a third subset of the plurality of prioritized objects, or a remainder of the plurality of non-prioritized objects, based on whether all prioritized objects, of the plurality of prioritized objects, have been processed,
the device processing the remainder of the plurality of non-prioritized objects when all of the prioritized objects have been processed, and
the device processing the third subset of the plurality of prioritized objects when not all of the prioritized objects have been processed.

12. The non-transitory computer-readable medium of claim 11, where the one or more instructions, that cause the one or more processors to process the second subset, cause the one or more processors to:

process at least one prioritized object, of the plurality of prioritized objects, as part of the second subset based on the temporal queue.

13. The non-transitory computer-readable medium of claim 7, where the one or more prioritized objects and the one or more non-prioritized objects correspond to respective route updates for a network that includes the device.

14. A method, comprising:
receiving, by a device, a plurality of prioritized objects and a plurality of non-prioritized objects to be processed,
the plurality of prioritized objects having a first priority level, and
the plurality of non-prioritized objects having a second priority level that is lower than the first priority level;
generating, by the device, a temporal queue that identifies the plurality of prioritized objects, the plurality of non-prioritized objects, and an order in which the plurality of prioritized objects and the plurality of non-prioritized objects were received by the device;
generating, by the device, a prioritized queue that identifies the plurality of prioritized objects based on the plurality of prioritized objects being associated with the first priority level;
processing, by the device, a first quantity of unprocessed objects, of the plurality of prioritized objects, based on the first quantity of the unprocessed objects being identified by the temporal queue,
the unprocessed objects being objects, of the plurality of prioritized objects and the plurality of non-prioritized objects, that have not been processed by the device;
processing, by the device, a second quantity of the unprocessed objects, of the plurality of prioritized objects and the plurality of non-prioritized objects, based on the prioritized queue;
selectively processing, by the device, a third quantity of the unprocessed objects, of the plurality of prioritized objects, or each unprocessed object of the plurality of non-prioritized objects, based on whether every prioritized object has been processed; and
performing, by the device, one or more actions based on:
processing the first quantity of the unprocessed objects,
processing the second quantity of the unprocessed objects, or
selectively processing the third quantity of the unprocessed objects.

15. The method of claim 14, where processing the plurality of prioritized objects and the plurality of non-prioritized objects comprises:
processing a subset of the plurality of prioritized objects; and
processing at least part of the plurality of non-prioritized objects after the subset of the plurality of prioritized objects is processed; and
processing a remainder of the plurality of prioritized objects after the subset of the plurality of prioritized objects is processed.

16. The method of claim 14, where performing the one or more actions further comprises:
updating or modifying a forwarding table of the device.

17. The method of claim 14, further comprising:
receiving an instruction indicating that a particular non-prioritized object, of the plurality of non-prioritized objects, is to be deleted;
determining that the particular non-prioritized object is associated with a same network address or a same route prefix as a particular prioritized object of the plurality of prioritized objects,
the particular non-prioritized object being received, by the device, earlier than the particular prioritized object; and
adding the particular non-prioritized object to the prioritized queue based on the particular non-prioritized object and the particular prioritized object being associated with the same network address or the same route prefix.

18. The method of claim 14, where the device is a particular network device of a network; and
where receiving the plurality of prioritized objects and the plurality of non-prioritized objects comprises:
receiving the plurality of prioritized objects and the plurality of non-prioritized objects from other network devices of the network.

19. The method of claim 14, where receiving the plurality of prioritized objects and the plurality of non-prioritized objects comprises:
receiving a plurality of objects; and
identifying each object, of the plurality of objects, as a prioritized object or a non-prioritized object based on at least one of:
a respective route associated with each object,
a respective network address associated with each object,
an object type associated with each object,
a respective network device from which each object is received, or
information received in association with each object,
the information indicating whether each object is associated with the first priority level or the second priority level.

20. The method of claim 14, where the second quantity of the unprocessed objects includes at least one prioritized object of the plurality of prioritized objects.

* * * * *